(12) United States Patent
Carl et al.

(10) Patent No.: US 8,827,853 B2
(45) Date of Patent: Sep. 9, 2014

(54) HYDRAULIC POWER SPLIT ENGINE WITH ENHANCED TORQUE ASSIST

(75) Inventors: Blake A. Carl, Richland, MI (US); Hao Zhang, Twinsburg, OH (US); Richard Kimpel, Middleburg Hts., OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/808,686

(22) PCT Filed: Jul. 8, 2011

(86) PCT No.: PCT/US2011/043300
§ 371 (c)(1),
(2), (4) Date: Jan. 7, 2013

(87) PCT Pub. No.: WO2012/006492
PCT Pub. Date: Jan. 12, 2012

(65) Prior Publication Data
US 2013/0121805 A1    May 16, 2013

Related U.S. Application Data

(60) Provisional application No. 61/362,459, filed on Jul. 8, 2010.

(51) Int. Cl.
*F16H 47/04* (2006.01)
*F04B 23/04* (2006.01)
*F16H 61/4096* (2010.01)
*B60K 6/12* (2006.01)
*F16H 37/08* (2006.01)

(52) U.S. Cl.
CPC ............ *F04B 23/04* (2013.01); *Y02T 10/6208* (2013.01); *F16H 47/04* (2013.01); *F16H 2037/0866* (2013.01); *F16H 2200/2005* (2013.01); *F16H 61/4096* (2013.01); *B60K 6/12* (2013.01)
USPC ........................................................ 475/72

(58) Field of Classification Search
None
See application file for complete search history.

(56) References Cited

U.S. PATENT DOCUMENTS 3,503,281 A * 3/1970 Gsching et al. ................. 475/32
3,712,489 A   1/1973 Jamison
(Continued)

FOREIGN PATENT DOCUMENTS

DE         4209950 C2 *  8/1994
DE     10 2008 008 236 A1   8/2009
(Continued)

OTHER PUBLICATIONS

International Search Report and Written Opinion of corresponding International Application No. PCT/US2011/043300, dated Aug. 23, 2011.
(Continued)

*Primary Examiner* — Dirk Wright
(74) *Attorney, Agent, or Firm* — Renner, Otto, Boisselle & Sklar, LLP

(57) ABSTRACT

A power split transmission includes a rotatable input shaft, a rotatable output shaft, and a planetary gear assembly connected between the input shaft and the output shaft. The transmission also includes a first hydraulic unit operable as a pump or a motor, the first hydraulic unit being coupled to the output shaft via the planetary gear assembly; a second hydraulic unit operable as a pump or a motor, the second hydraulic unit being coupled to the output shaft independently of the planetary gear assembly; and a braking mechanism coupled to the input shaft that is selectively engageable to retard rotation of the input shaft in at least one direction. The braking mechanism enables the power split transmission to use both the first hydraulic unit and the second hydraulic unit to provide enhanced torque at the output shaft without damaging a prime mover coupled to the input shaft.

11 Claims, 1 Drawing Sheet

(56) References Cited

U.S. PATENT DOCUMENTS

| | | | |
|---|---|---|---|
| 3,732,751 A * | 5/1973 | Berman et al. ............... | 475/2 |
| 4,098,144 A | 7/1978 | Besel et al. | |
| 4,341,132 A * | 7/1982 | Burdick ....................... | 475/72 |
| 4,347,701 A | 9/1982 | Eddens et al. | |
| 4,778,020 A | 10/1988 | Hagin et al. | |
| 4,813,306 A * | 3/1989 | Kita et al. ..................... | 475/80 |
| 5,433,282 A * | 7/1995 | Moroto et al. ................ | 180/65.21 |
| 5,505,527 A | 4/1996 | Gray, Jr. et al. | |
| 5,785,623 A * | 7/1998 | Iino et al. ..................... | 475/72 |
| 6,039,666 A * | 3/2000 | Okuda et al. .................. | 475/72 |
| 6,086,501 A * | 7/2000 | Takatori et al. ............... | 475/72 |
| 6,251,037 B1 | 6/2001 | Baumgaertner et al. ........ | 475/2 |
| 6,453,222 B1 * | 9/2002 | Lasson et al. ................. | 701/22 |
| 6,679,058 B1 | 1/2004 | Andreotti | |
| 6,937,931 B2 * | 8/2005 | Funato et al. ................. | 701/54 |
| 6,997,838 B2 * | 2/2006 | Folsom et al. ................ | 475/72 |
| 7,100,723 B2 | 9/2006 | Roethler et al. | |
| 7,273,122 B2 | 9/2007 | Rose | |
| 7,398,845 B2 * | 7/2008 | Kuang et al. ................. | 180/65.265 |
| 7,494,438 B2 * | 2/2009 | Kimura et al. ................ | 475/150 |
| 7,537,075 B2 | 5/2009 | Gray, Jr. et al. | |
| 7,654,354 B1 | 2/2010 | Otterstrom | |
| 7,892,130 B1 * | 2/2011 | Gollner et al. ................ | 475/73 |
| 8,206,262 B2 * | 6/2012 | Hehenberger ................. | 477/37 |
| 8,277,352 B2 * | 10/2012 | Ivantysynova et al. ......... | 475/73 |
| 8,425,358 B2 * | 4/2013 | Tsyganov ..................... | 475/5 |
| 8,454,467 B2 * | 6/2013 | Meise et al. .................. | 475/82 |
| 8,454,469 B2 * | 6/2013 | Ivantysynova et al. ........ | 475/129 |
| 8,517,133 B2 * | 8/2013 | Carl et al. ..................... | 180/165 |
| 8,585,523 B2 * | 11/2013 | Yamada ........................ | 475/5 |
| 2005/0167177 A1 | 8/2005 | Roethler et al. | |
| 2008/0081724 A1 | 4/2008 | Ivantysynova et al. | |
| 2008/0314664 A1 | 12/2008 | Mueller et al. | |
| 2009/0036248 A1 | 2/2009 | Mueller et al. | |
| 2010/0122864 A1 | 5/2010 | Rosman | |
| 2010/0203995 A1 * | 8/2010 | Zhang et al. ................... | 475/5 |
| 2012/0149514 A1 * | 6/2012 | Tiwari et al. .................. | 475/5 |

FOREIGN PATENT DOCUMENTS

| | | |
|---|---|---|
| WO | 2008/033378 A1 | 3/2008 |
| WO | WO 2008033378 A1 * | 3/2008 |
| WO | WO 2008151527 A1 * | 12/2008 |

OTHER PUBLICATIONS

International Preliminary Report on Patentability of corresponding International Application No. PCT/US2011/043300, dated Aug. 23, 2012.

* cited by examiner

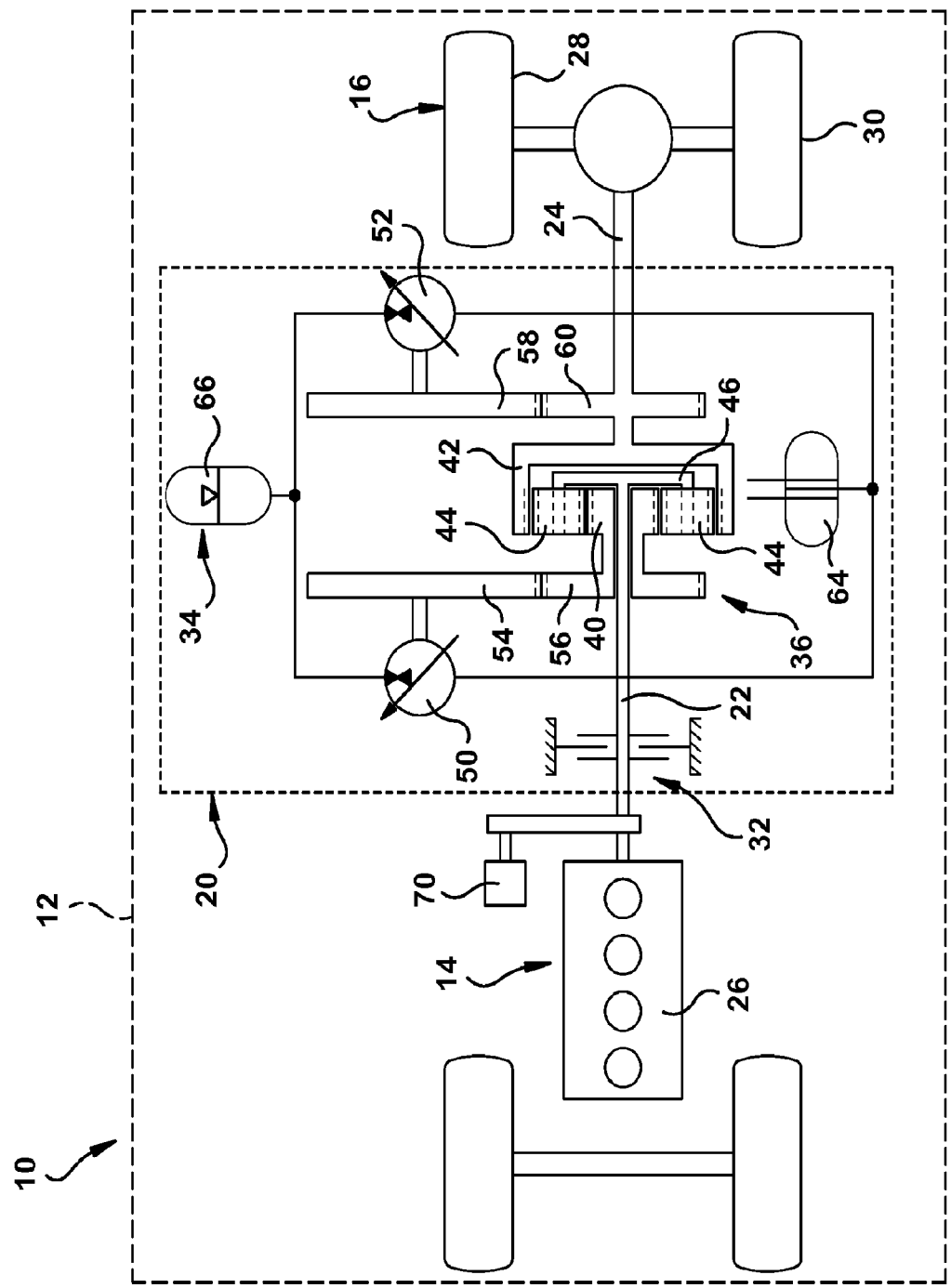

HYDRAULIC POWER SPLIT ENGINE WITH ENHANCED TORQUE ASSIST

RELATED APPLICATIONS

This application claims the benefit of U.S. Provisional Application No. 61/362,459 filed Jul. 8, 2010, which is hereby incorporated herein by reference.

FIELD OF THE INVENTION

This invention relates generally to a power transmission system, and more particularly to a system having an output-coupled hydraulic power split transmission.

BACKGROUND

A transmission typically converts a speed input from a power source, such as an internal combustion engine, and outputs a different speed to another device that consumes the power provided, such as drive wheels for a vehicle. A hybrid power split transmission can enhance the output or store input energy for later output. Such devices often can be used to capture excess energy from the primary power source or recover energy from the power consumer, such as from braking the drive wheels of a vehicle, thereby further increasing efficiency.

Power split transmissions with both mechanical and hydraulic components generally can be categorized as either an input-coupled type, where the hydraulic system is coupled to the input, or an output-coupled type, where the hydraulic system is coupled to the output. In both types the power source typically is mechanically coupled to a power consumer, for example via a planetary gear assembly.

SUMMARY OF THE INVENTION

The present invention improves on previous power split transmissions, particularly output-coupled power split transmissions, to provide enhanced torque at the output. The present invention also provides a method for increasing the efficiency of a system with a power split transmission by using stored or available energy to drive the power source, rather than the usual fuel, and thereby power one or more accessories drivingly coupled to the engine. This is particularly beneficial when the amount of energy available for capture is greater than the available energy in the energy storage device.

More particularly, the present invention provides a power split transmission, comprising a rotatable input shaft, a rotatable output shaft, and a planetary gear assembly connected between the input shaft and the output shaft; a first hydraulic unit operable as a motor, the first hydraulic unit being coupled to the output shaft via the planetary gear assembly; a second hydraulic unit operable as a motor, the second hydraulic unit being coupled to the output shaft independently of the planetary gear assembly; and a braking mechanism coupled to the input shaft that is selectively engagable to retard rotation of the input shaft in at least one direction.

The power split transmission of claim 1 or any other claim depending from claim 1, where the hydraulic transmission includes a hydraulic energy storage device in fluid connection with the first and second hydraulic units.

A method of increasing the efficiency of a system having a supply of pressurized hydraulic fluid in combination with a hydraulic motor operatively coupled to an internal combustion engine, the method comprising the step of operating the hydraulic motor to drive the engine to power one or more accessories drivingly coupled to the engine.

Further features of the invention will become apparent from the following detailed description when considered in conjunction with the drawings.

BRIEF DESCRIPTION OF THE DRAWINGS

FIG. 1 is a schematic drawing of a vehicle with an exemplary power split transmission in accordance with the invention.

DETAILED DESCRIPTION

As mentioned above, the present invention improves on previous power split transmissions, particularly output-coupled power split transmissions, to provide enhanced torque. Referring now to FIG. 1, an exemplary system 10 constructed in accordance with the present invention is shown incorporated into a vehicle 12. The illustrated system 10 includes a power source 14, sometimes referred to as a prime mover, a power consumer 16, and a power split transmission 20. A common power source 14 is an internal combustion engine 26 and a typical power consumer 16 is one or more driven wheels 28 and 30. The power split transmission 20 includes a rotatable input shaft 22 connected to the power source 14 and a rotatable output shaft 24 connected to the power consumer 16. The input shaft 22 transmits power from the power source 14 to the power split transmission 20 and then to the output shaft 24 and the power consumer 16. In some situations the power consumer 16 can provide power back to the power split transmission 20, as described below.

The illustrated system 10 also includes a braking mechanism 32 coupled to the input shaft 22. The braking mechanism 32 is a discrete element, distinguished from an engine or other power source 14 that is not operating. The braking mechanism 32 is selectively engageable to regard rotation of the input shaft 22 in at least one direction. The braking mechanism 32 can include a passive one-way clutch or pawl system, or an active brake that is controlled to selectively engage the input shaft 22.

The power split transmission 20 also provides a mechanical connection for transferring power between the input shaft 22 and the output shaft 24, such as the illustrated planetary gear assembly 36 connected between the input shaft 22 and the output shaft 24. The planetary gear assembly 36 includes a sun gear 40, a ring gear 42, a plurality of planet gears 44, and a carrier 46 associated with the planet gears 44. The transmission 20 is not limited to the illustrated planetary gear assembly 36. The planetary gear assembly can have multiple rings, multiple suns or other configurations. In the illustrated embodiment, the input shaft 22 is operatively connected to the carrier 46 for inputting motion to the planet gears 44, and the output shaft 24 is operatively connected to the ring gear 42, which is driven by the movement of the planet gears 44.

The power split transmission 20 can include a hydraulic power split transmission or an electric power split transmission. The illustrated transmission 20 further includes hydraulic components for storing energy and for later use as an alternative power source or to complement or assist the power source 14. These hydraulic components include an energy storage device 34, a first hydraulic unit 50 (e.g., the primary unit) coupled to the output shaft 24 via the planetary gear assembly 36, and a second hydraulic unit 52 (e.g., the secondary unit) coupled to the output shaft 24 independently of the planetary gear assembly 36. The transmission 20 transmits power from the power source 14 to the power consumer 16 and to the energy storage device 34 for subsequently augmenting or replacing the power source 14 in providing power to the power consumer 16.

The transmission 20 also can recover energy from the power consumer 16 and store it in the energy storage device 34 for later use, such as when reducing a vehicle's speed. The stored power can then be used to temporarily supplement or replace power from the power source 14. The first and second hydraulic units 50 and 52 are variable pump/motors that may be operated as a pump and as a motor, under particular circumstances. A controller (not shown) controls the displacement of the first and second hydraulic units 50 and 52. The sun gear 40 is coupled to the first hydraulic unit 50 via a gear ratio determined by interposed spur gears 54 and 56. The ring gear 42 is coupled to the second hydraulic unit 52 via another gear ratio determined by spur gears 58 and 60. The spur gears 54, 56, 58, and 60 may alternatively be helical or beveled gears.

The power split transmission 20 provided by the invention is an output-coupled power split transmission, which means that the hydraulic components act directly on the output side of the planetary gear assembly 36. One member of the planetary gear assembly 36 (in this case the carrier 44) is connected to the input shaft 22, a second member (in this case the sun gear 40) is connected to the first hydraulic unit 50, and a third member (in this case the ring gear 42) is connected to the output shaft 24. Rotation of the input shaft 22 drives the planet carrier 46, which drives the planets 44, which in turn drive the sun gear 40 and the ring gear 42. The sun gear 40 drives the first hydraulic unit 50 via the spur gear 56 coupled to the sun gear 40. The spur gear 56 associated with the sun gear 40 is in driving connection with the spur gear 54 associated with the first hydraulic unit 50. The second hydraulic unit 52 is coupled to spur gears 58 and 60, the latter spur gear 56 being in driving connection with the output shaft 24.

The first and second hydraulic units 50 and 52 are hydraulically coupled to each other via a hydraulic circuit that also fluidly connects the first and second hydraulic units 50 and 52 to a low pressure reservoir 64 and a hydraulic energy storage device 34, such as an accumulator 55. The accumulator 66 provides a source of power to propel the vehicle under certain conditions and can be energized by operation of one or both of the first and second hydraulic units 50 and 52 acting as a pump, or with another source of pressurized fluid outside the illustrated system 10.

The system 10, when assembled into a vehicle 12, may be used for both propelling the vehicle 12 by imparting power to drive wheels 28 and 30 of the vehicle 12 and retarding movement of the vehicle 12 by absorbing power from the drive wheels 28 and 30. In standard operating modes, the system 10 continues to operate like previous power split transmissions. In a standard propelling mode the power source 14 drives the input shaft 22 and the gears distribute power to both the planetary gear assembly 36 and the first hydraulic unit 50. The second unit 52 acts as a motor, using the pressurized fluid from either the first unit or the accumulator 66 to supply power to the drive wheels 28 and 30 of the vehicle 12. The second hydraulic unit 52 and the planetary gear assembly 36 drive the output shaft 24 and the power consumer 16 or wheels 28 and 30. In a standard retarding mode, the second unit 52 is reversed and acts as a pump that is driven by the drive wheels 28 and 30 of the vehicle 12 for pumping fluid into the accumulator 66.

The system 10 further is adapted to operate in torque-assisted propelling or retarding modes using the braking mechanism 32. In each of these torque-assisted modes, the first unit 50, acting through the planetary gear assembly 36, supplements the work of the second unit 52 acting more directly on the output shaft 24. In the torque-assisted retarding mode the first unit 50, acting through the planetary gear assembly 36, supplements the second unit 52 in retarding movement of the vehicle 12 and assists the second unit 52 in pumping fluid to the accumulator 66. In one embodiment, the second unit 52 is favored with the first unit 50 only used to supplement the braking torque. As such, the second unit 52 displacement typically is held at its maximum value during the torque-assist retarding mode.

Similarly, in the torque-assisted propelling mode the first unit 50, again acting through the planetary gear assembly 36, supplements the second unit 52 in using stored fluid in the accumulator 66 to propel the vehicle 12. This increases the torque at the vehicle drive shaft, i.e, the output shaft 24, by allowing the first hydraulic unit 50 to provide additional torque (either braking torque or propelling torque) through the transmission via the planetary gear assembly 36 to assist the second hydraulic unit 52. In one embodiment, the second unit 52 is favored with the first unit 50 only used to supply additional propelling torque. In which case, the second unit 52 displacement typically is held at its maximum value during the torque-assist propelling mode.

To operate in the torque-assisting modes, care must be taken to prevent the prime mover 14 from being back-driven by driving the input shaft 22 in a reverse direction. This is the task of the braking mechanism 32. The braking mechanism 32, alternatively referred to as a lockup mechanism, may be a clutch, a locking pawl, or a drum or disk brake and may be controlled either mechanically or electrically. Ideally, the braking mechanism 32 is only engaged to lock up the input shaft 22 and prevent its rotation when the engine speed is at or near zero at the time of engagement.

In a vehicle 12 having a power split transmission 20, the prime mover 14 can be shut down during braking to avoid idling losses. The second unit 52 acts as a pump for receiving power from the drive wheels 28 and 30 and provides fluid under pressure to the accumulator 66.

In the system 10 provided by the invention, the prime mover 14 is shut down or otherwise uncoupled upon actuation of the vehicle brakes (not shown), as appropriate given the control of the system 10, fuel to the prime mover 14 is shut-off and the first unit 50 is controlled to rapidly slow down the engine speed (corresponding to revolutions per minute (RPM) of the input shaft 22). Once the engine speed has reached an acceptable speed at or near zero, the braking mechanism 32 acts to lock the input to the transmission 20, i.e., the input or carrier shaft 22 as illustrated in FIG. 1. Then the first unit 50 is controlled to act as a pump for pumping fluid under pressure to the accumulator 66 to provide additional braking torque through the planetary gear assembly 36 and thus on the drive wheels 28 and 30 of the vehicle 12. Controlling the first unit 50 in this manner places a positive aiding-torque on the input shaft 22. Without the action of the engaged braking mechanism 32, the first unit 50 would otherwise speed up the input shaft 22 in the positive direction. The braking mechanism 32 resists this torque and keeps the engine input shaft 22 fixed, at zero revolutions per minute.

Put in simpler terms, when the hydraulic system is being used for regenerative braking, the hydraulic system augments or replaces friction brakes on the wheels of a vehicle. The hydraulic system is controlled to resist movement in the output shaft, and thus movement of the wheels and the vehicle as a whole. The first and second hydraulic units also recharge the accumulator. Partial braking provided by the hydraulic system can augment the braking of the friction brakes to reduce the vehicle speed while also charging the accumulator.

A vehicle 12 with a power split transmission 20 provided by the invention also may be driven with the prime mover 14 off (engine off operation). The prime mover 14 is shut down when deemed appropriate, such as when the pressure in the accumulator 66 is above a predetermined value. With stored energy in the accumulator 66, the second unit 52 is controlled as a motor to receive fluid from the accumulator 66 and power the vehicle 12. The braking mechanism 32 can be controlled in view of the system pressure or other factors. With the braking mechanism 32 engaged to hold the engine shaft speed at zero, the first unit 50 is controlled as a motor to provide additional propelling torque to the output shaft 24 through the planetary gear assembly 36. Controlling the first unit 50 in this manner places a negative (resisting) torque on the prime mover output shaft (the input shaft 22) which would otherwise turn the input shaft 22 in a reverse direction, potentially damaging the prime mover 14. The braking mechanism 32 resists this torque and keeps the engine shaft, i.e. the input shaft 22, speed at zero. Once the stored energy of the accumulator 66 has dropped below a predefined level, the braking mechanism 32 is disengaged and the first unit 50 is controlled to hydraulically start the prime mover 14 by acting as a motor to speed up the prime mover 14 as fuel is again supplied to the prime mover 14.

Alternatively, the first unit 50 can be controlled as a pump to provide additional braking or a motor to provide reverse-driving torque to the output shaft 24 through the planetary gear assembly 36. Controlling the first unit 50 in this manner places a positive torque on the prime mover output shaft (the input shaft 22) which would otherwise turn the input shaft 22 in a forward direction beyond the speed at which the input shaft 22 would otherwise be driven by the prime mover 14 (overspeed), again potentially damaging the prime mover 14. The braking mechanism 32 resists this torque and keeps the engine shaft, i.e. the input shaft 22, speed at zero. Once the stored energy of the accumulator 66 has exceeded a predefined level or reached its capacity, the braking mechanism 32 is disengaged and the first unit 50 is controlled to hydraulically start the prime mover 14 by acting as a motor to speed up the prime mover 14 as fuel is again supplied to the prime mover 14 to drive the vehicle in a reverse direction or resist the torque provided by the wheels, i.e., the power consumer, to slow down the vehicle.

Operating the system 10 in the torque-assist modes increases the rate of both acceleration and braking of a vehicle 12. Thus the torque-assist modes provide advantages over current hydraulic regenerative drive systems; namely, the torque-assist retarding mode provides additional braking torque and the torque-assist propelling mode provides additional propelling torque, which is particularly useful at times during engine off driving (such as at idle or on a downhill grade).

Thus the present invention provides a power split transmission 20 with means 32 for braking the input shaft 22 so that the first hydraulic unit 50, which otherwise must act as a pump, acts as motor, driven by fluid pressure provided by the accumulator 66, to drive the planetary gear train 36 via the sun gear 40 and thus to drive the output shaft 24 in a torque-assist propelling mode. The present invention also provides a power split transmission 20 with means for braking the input shaft 22 so that the first hydraulic unit, acting as a pump to increase fluid pressure into the accumulator 66, to drive the planetary gear train 36 via the sun gear 40 to resist rotation of the output shaft 24 in a torque-assist retarding mode. The output shaft 24 is coupled to the ring gear 42 to augment the torque provided by the secondary unit 52 to the output shaft 24 independently of the planetary gear train 36.

The system 10 provided by the present invention also saves fuel by interrupting the fuel supply to an engine or other power source 14 during an idle condition, unloading the engine 14 and driving the input shaft 22 to maintain rotation in the engine 14 using one or more hydraulic units 50 and 52 operating as either pumps or motors. Unlike the previous case where the input shaft 22 is held in a fixed position to keep the input shaft 22 from reversing and damaging the engine 14, the first unit 50 is controlled to drive the input shaft 22 in its usual, forward direction so as to not damage the engine 14. The present invention also provides a method for increasing the efficiency of a system 10 with a power split transmission 20 by using stored or available energy to drive the power source 14, rather than the usual fuel, and thereby overcoming engine friction loses and powering one or more accessories 70 drivingly coupled to the engine 14. This is particularly beneficial when the amount of energy available for capture is greater than the available energy in the energy storage device 34, e.g. accumulator 66, or another supply of energy.

Accordingly, the present invention provides a method of increasing the efficiency of a system having a supply of pressurized hydraulic fluid, in combination with a hydraulic motor operatively coupled to an internal combustion engine or other power source. The method includes the step of operating the hydraulic motor to drive the engine to power one or more accessories drivingly coupled to the engine. This method is particularly advantageous when the amount of energy available for capture is greater than the available energy in the energy storage device. Thus the engine can be stopped, wherein fuel is effectively cut off from the engine, and the input shaft is driven using stored power to drive the accessories associated with the engine, such as an electricity generator or alternator, and to power additional vehicle accessories as lights, a radio or other electronic devices, air conditioning or other ventilation or heating or cooling device, etc.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power split transmission, comprising:
    a rotatable input shaft a rotatable output shaft, and a planetary gear assembly connected between the input shaft and the output shaft;
    a first hydraulic unit coupled to the output shaft via the planetary gear assembly;
    a second hydraulic unit coupled to the output shaft independently of the planetary gear assembly;
    a braking mechanism coupled to the input shaft that is selectively engagable to retard rotation of the input shaft in at least one direction; and
    a hydraulic energy storage device in fluid connection with the first and second hydraulic units;

where each of the first unit and the second unit can function as either a pump or a motor.

2. The power split transmission of claim 1, where the planetary gear assembly includes a sun gear, a ring gear, a plurality of planet gears, and a carrier associated with the planet gears.

3. The power split transmission of claim 2, where the first hydraulic unit is connected to the sun gear before any other element of the planetary gear assembly.

4. The power split transmission of claim 2, where the input shaft is operatively connected to the carrier for inputting motion to the planet gears, and the output shaft is operatively connected to the ring gear.

5. The power split transmission of claim 2, where the first hydraulic unit is operatively connected to the sun gear of the planetary gear train.

6. The power split transmission of claim 1, in combination with a power source coupled to the input shaft.

7. A vehicle comprising the combination of claim 6, where the power source includes an internal combustion engine.

8. The power split transmission of claim 1, in combination with a power consumer coupled to the output shaft.

9. A vehicle comprising the combination of claim 8, where the power consumer includes one or more wheels.

10. A method of increasing the efficiency of a system having a supply of pressurized hydraulic fluid in combination with a first hydraulic unit operatively coupled to an input shaft connected to an internal combustion engine and a second hydraulic unit operatively coupled to an output shaft connected to the input shaft via a planetary gear assembly, and a braking mechanism coupled to the input shaft that is selectively engageable to retard rotation of the input shaft in at least one direction, the first hydraulic unit and the second hydraulic unit being reversible to operate as either a pump for pressurizing hydraulic fluid or a motor for driving a respective input shaft or output shaft, the method comprising the steps of:

operating each of both the first hydraulic unit and the second hydraulic unit as a motor to drive the input shaft and the engine to overcome engine friction losses and to power one or more accessories drivingly coupled to the engine;

operating the first hydraulic unit as a pump and the second hydraulic unit as a motor to assist the engine in driving the output shaft;

applying the braking mechanism to the input shaft and operating the first hydraulic unit as a pump and the second hydraulic unit as a pump using rotation of the output shaft to pressurize hydraulic fluid for the supply of pressurized hydraulic fluid.

11. A method of controlling a powersplit transmission system having a rotatable input shaft, a rotatable output shaft, and a planetary gear assembly connected between the input shaft and the output shaft; a first hydraulic unit coupled to the output shaft via the planetary gear assembly; a second hydraulic unit coupled to the output shaft independently of the planetary gear assembly; a braking mechanism coupled to the input shaft that is selectively engagable to retard rotation of the input shaft in at least one direction; and a hydraulic energy storage device in fluid connection with the first and second hydraulic units; where each of the first unit and the second unit can function as either a pump or a motor; the method comprising the steps of:

driving the first unit as either a pump or a motor, and driving the second unit in a different mode as either a motor or a pump at a first time;

driving both the first unit and the second unit in the same mode as either a pump or a motor at a second time different the first time; and braking the input shaft during the second time to resist torque transfer through the input shaft, thereby minimizing transfer of reverse rotational motion through the input shaft or excessive rotation of the input shaft.

* * * * *